Oct. 24, 1933.  S. BELLANTESE  1,932,031
SAFETY DEVICE FOR VEHICLES
Filed July 29, 1932
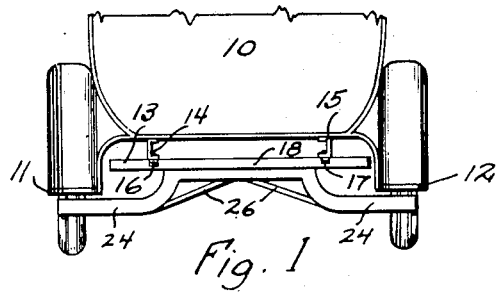
Fig. 1
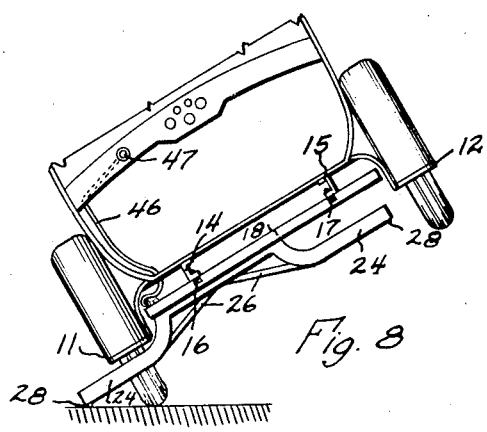
Fig. 8
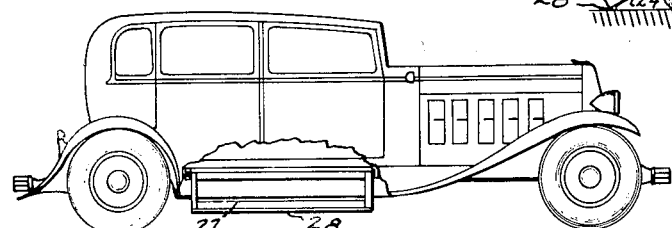
Fig. 2
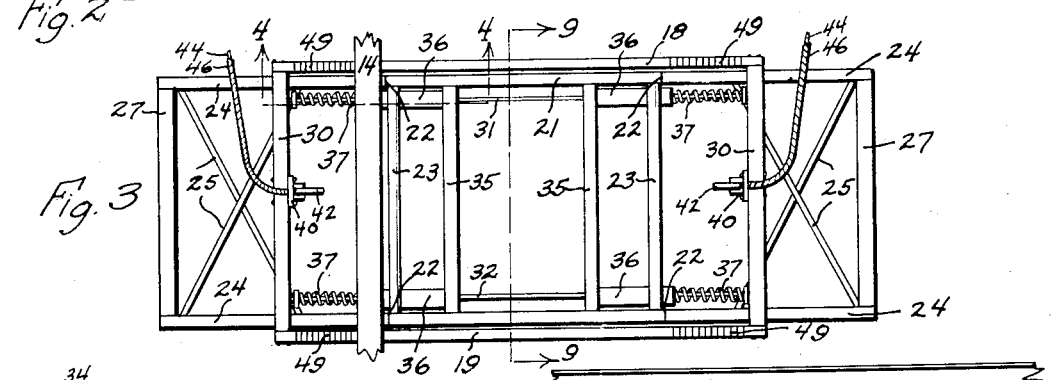
Fig. 3
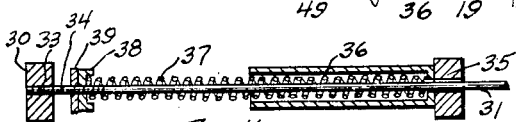
Fig. 4
Fig. 9
Fig. 5  Fig. 7
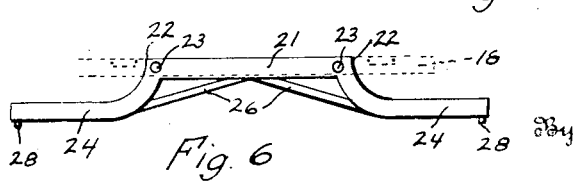
Fig. 6
Inventor
Saverio Bellantese
Lynn H. Latta
By
Attorney Patented Oct. 24, 1933

1,932,031

UNITED STATES PATENT OFFICE 1,932,031

SAFETY DEVICE FOR VEHICLES

Saverio Bellantese, Sioux City, Iowa

Application July 29, 1932. Serial No. 625,725

10 Claims. (Cl. 280—150)

My invention relates to a safety device for vehicles adapted primarily to prevent tipping of such vehicles.

An object of my invention is to provide a safety device which will prevent the tipping of a vehicle when the same lies on its two inner wheels when rounding a curve or in case it goes into a ditch.

Another object of my invention is to provide such means which will be hidden at all times so as not to effect an unsightly appearance of the vehicle, especially in the case when used on an automobile for which the device is used principally.

A further object of my invention is to make the device of such construction that it is rigid and performs its functions suitably and in a simple manner.

A further object of my invention is to provide a unit of this type which can be readily attached to a vehicle so that it will not be necessary to have the unit formed together with the vehicle and so that the unit can be attached to any type of car at any time.

A further object of my invention is to provide the above mentioned objects with a construction of the greatest possible simplicity and which can be made with a minimum of manufacturing costs.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which Figure 1 is a rear view of a vehicle with my device attached, Figure 2 is a side view of an automobile partly broken away to show the device attached, Figure 3 is a plan view of the device, Figure 4 is an enlarged sectional view taken along the lines 4—4 of Figure 3, Figure 5 is an enlarged detail view of the catch mechanism, Figure 6 is an elevation of the device, Figure 7 is an enlarged sectional view of the friction shoe, Figure 8 is a sectional view of the vehicle tipping on two wheels and showing how the device operates in this case, and Figure 9 is a sectional view of Figure 3 taken along the line 9—9.

I have used the reference character 10 to designate generally the body of the automobile or vehicle which includes the running boards 11 and 12.

The principal frame 13 is bolted beneath the car by means of the channels 14 and 15 as shown in Figure 1. The frame 13 is bolted with the bolts 16 and 17. The frame 13 includes the C-shaped channels 18 and 19, which receive the wheels 20, (see Figure 9), which wheels 20 are attached to the further frame 21.

The frame 21 terminates at the corners 22, and between the ends of the frame are secured the rigid and strong rods 23.

The frame 21 carries the extensions 24 which are made of steel of great tensile strength and between which members 24 are situated the rigidly secured cross members 25.

The frame 21 is further braced to the extensions 24 by means of vertical bracings 26, which are secured in any manner well known in the art.

The ends of the sections 24 include cross pieces 27 in which is riveted the hard rubber, leather or other suitable frictioning means 28. (See Figures 7 and 8.) This member 28 is merely a long strip of such material solidly fastened in the manner shown by means of the rivets 29 and extends substantially the entire length of the cross piece 27.

Attached between the end pieces 30 of the frame 18 are the rods 31 and 32. These rods are attached by means of the threaded connection at 33, (see Figure 4), and the threads at the ends are continued inwardly as at 34.

Attached to the end members 35 of the frame 21 are the cylindrical members 36. The cylindrical members 36 receive the four springs 37 as shown in Figure 4, and the outer end of the springs 37 rest against the cup-shaped nut 38, which is locked in place by means of the further half-nut 39.

It will be seen that the nuts 38 and 39 can be turned backwardly or forwardly along the thread 34 to adjust the tension of the spring 37. The spring 37 is of relatively weak construction for the purposes of which will be explained.

Atttached at the center of each cross member 30 is the catch support 40, which includes the pin 41 and the catch 42.

Attached to the catch 42 to the portion 43 is the wire 44, which is attached at 45. The wire 44 passes through the hollow steel cable 46, which cable passes upwardly inside the vehicle as shown in Figure 8 and terminates in the dashboard at 47 where the wire extends slightly outwardly in the form of a small knob.

Between the member 40 and the member 43 is positioned the spring 48. (See Figure 5.)

The frame 18 includes the numbered graduations 49 which are provided for adjusting the device.

It will now be seen that the entire frame 21 is slideable within the frame 18 and also that the frame 21 carries the integral extensions 24, and the rods 23.

The frame 21 will move freely within the frame 13 by means of the engagement of the wheels 20 therein.

Normally the frame 21 will be centrally disposed, due to the tension of the springs 37 against it and as the vehicle or automobile travels along the road, the slight jars and side motions will tend to create a slight to and fro play in this frame, which however will be kept constantly near the center, due to the tension of the spring action. However in rapidly turning a corner on a level road or on an embankment, it very often happens that a car will tip inwardly. In this event however, due to the relative weakness of the springs 37 and the weight of the frame 21 when rounding such a turn or when tipping, the frame will be thrown over as shown in Figure 8 and the springs 37 compressed. At approximately the time of such compression of the springs, the rod 23 will slide under the catch 42, (see Figure 5), and the frame will be held in the position as shown in Figure 8, and it will be impossible for the frame to slip backwardly in the channels again, due to the retention of the catch, and it will be impossible for the vehicle to tip.

It will be seen that the member 24 is just beneath the running-board 11 and even if the member 24 will not absorb all the strain, the slight bending effect produced may bring it back up against the running-board and tend to further strengthen it. Immediately soon after the vehicle will soon have righted itself to its normal position, and the catch 42 will be released from the dashboard by means of pulling the wire 44 outwardly, which will release its catch about the rod 23, and the frame 21 will spring back to its normal position ready for the next emergency. The same operation will take place in tipping either way.

The tension on the springs 37 can be increased or decreased by means of turning the nut 31 and then locking the nut by a further nut 39. For instance in some cases in testing the device, the maximum amount of throw necessary to bring the rod 23 under the catch will have to be determined and to further aid this result I provide the graduations 49, which are numbered in increasing ratio outwardly so that the proper effects of momentum can be tested and determined so that the most effective adjustments can be made for properly operating the device.

There will be some bend in the cable 46 when the device operates either way, which however will cause no injury to the cable since these occurrences are relatively rare.

It will be seen that when the device tips that the shoe 28 strikes the ground, and this shoe is made of any suitable material of proper frictional qualities to provide a fairly uniform sliding action with some resistance and to further aid in taking away the wearing friction from the cross member 27.

This shoe 28 will strike the ground at the maximum position of tipping and will be in contact with the ground for only a short period of time so that its wearing qualities will be maintained for a long period of time.

It will be understood that my device can be attached to the underside of any vehicle and especially automobiles, and although the various structures under such vehicles have not been shown, it will be readily apparent that the frame of course can be fastened in any manner well known in the art.

This device can be used for any type of vehicle or automobile and can find a useful application in the case of racing cars.

It will now be seen that I have provided a safety device which will prevent tipping of vehicles or automobiles in any emergency, which device is hidden from sight and obviates the unsightly appearance of such a vehicle.

It will be seen further that I have provided this device of such construction that it is rigid and performs its functions in a suitable manner.

It will also be seen that the device is removable and can be attached to any vehicle and that it is of simple construction, which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A safety device for vehicles comprising a frame arranged to be attached beneath the vehicle, a safety frame slidably engaged with the frame, compression means between the frame and the safety frame, means for adjusting the compression means, and means for locking the safety frame when thrown outwardly.

2. A safety device for vehicles comprising a frame arranged to be attached beneath the vehicle, a safety frame slidably engaged with the frame, compression means between the frame and the safety frame, means for adjusting the compression means, and means for locking the safety frame when thrown outwardly, including a spring operated catch attached to the frame, arranged to slide beneath the catch.

3. A safety device for vehicles comprising a frame arranged to be attached beneath the vehicle, a safety frame slidably engaged with the frame, compression means between the frame and the safety frame, means for adjusting the compression means, and means for locking the safety frame when thrown outwardly, including a spring operated catch attached to the frame, arranged to slide beneath the catch, and means for releasing the catch from the dashboard of a vehicle.

4. A safety device for vehicles comprising a frame arranged to be attached beneath the vehicle, a safety frame slidably engaged with the frame, compression means between the frame and the safety frame, means for adjusting the compression means, and means for locking the safety frame when thrown outwardly, including a spring operated catch attached to the frame, arranged to slide beneath the catch, and means for releasing the catch from the dashboard of a vehicle, comprising a hollow cable, a wire received within the cable and attached to the catch.

5. A safety device for automobiles and the like comprising a frame attached beneath the automobile, said frame including a pair of channel-shaped members, a plurality of wheels received within the members, a safety frame attached to the wheels including extensions adapted to slide under the running-boards of the automobile, tension means betwen the frame and the safety frame.

6. A safety device for automobiles and the like comprising a frame attached beneath the automobile, said frame including a pair of channel-shaped members, a plurality of wheels received within the members, a safety frame attachd to the wheels including extensions adapted to slide under the running-boards of the automobile, tension means between the frame and the safety frame, and means for locking the safety frame in either of its extended positions.

7. A safety device for automobiles and the like comprising a frame attached beneath the automobile, said frame including a pair of channel-shaped members, a plurality of wheels received within the members, a safety frame attached to the wheels including extensions adapted to side under the running-boards of the automobile, tension means between the frame and the safety frame, and means for locking the safety frame in either of its extended positions, including a spring operated catch attached to the frame, and a rod attached to the safety frame arranged to slide beneath the catch.

8. A safety device for automobiles and the like comprising a frame attached beneath the automobile, said frame including a pair of channel-shaped members, a plurality of wheels received within the members, a safety frame attached to the wheels including extensions adapted to slide under the running-boards of the automobile, tension means between the frame and the safety frame, and means for locking the safety frame in either of its extended positions, including a spring operated catch attached to the frame, and a rod attached to the safety frame arranged to slide beneath the catch, and means for releasing the catch from the dashboard of the automobile.

9. A safety device for automobiles and the like comprising a frame attached beneath the automobile, said frame including a pair of channel-shaped members, a plurality of wheels received within the members, a safety frame attached to the wheels including extensions adapted to slide under the running-boards of the automobile, tension means between the frame and the safety frame, and means for locking the safety frame in either of its extended positions, including a spring operated catch attached to the frame, and a rod attached to the safety frame arranged to slide beneath the catch, and means for releasing the catch from the dashboard of the automobile, said tension means comprising a plurality of springs, guide rods received within the springs and extending the length of the frame.

10. A safety device for automobiles and the like comprising a frame attached beneath the automobile, said frame including a pair of channel-shaped members, a plurality of wheels received within the members, a safety frame attached to the wheels including extensions adapted to slide under the running-boards of the automobile, tension means between the frame and the safety frame, and means for locking the safety frame in either of its extended positions, including a spring operated catch attached to the frame, and a rod attached to the safety frame arranged to slide beneath the catch, and means for releasing the catch from the dashboard of the automobile, said tension means comprising a plurality of springs, guide rods received within the springs and extending the length of the frame, and means for adjusting the tension of the springs including nuts threadably engaged with the rods.

SAVERIO BELLANTESE.